United States Patent [19]
Yamanaka et al.

[11] Patent Number: 5,540,633
[45] Date of Patent: Jul. 30, 1996

[54] CONTROL DEVICE FOR VARIABLE DISPLACEMENT ENGINE

[75] Inventors: Akihiro Yamanaka; Toyokazu Baika; Kenichiroh Shindoh, all of Susono; Toshiaki Asada; Kenichi Nomura, both of Mishima, all of Japan

[73] Assignee: Toyota Jidosha Kabushiki Kaisha, Toyota, Japan

[21] Appl. No.: 301,954

[22] Filed: Sep. 7, 1994

[30] Foreign Application Priority Data

Sep. 16, 1993 [JP] Japan .................................... 5-230296

[51] Int. Cl.$^6$ .................................................. F02D 29/02
[52] U.S. Cl. ........................ 477/107; 477/110; 477/111; 123/198 F
[58] Field of Search ................................. 477/107, 109, 477/110, 111; 123/481, 198 F

[56] References Cited

U.S. PATENT DOCUMENTS

| 4,129,109 | 12/1978 | Matsumoto | 123/198 F |
| 4,509,488 | 4/1985 | Förstor et al. | 123/481 |
| 4,550,704 | 11/1985 | Barho et al. | 123/481 |

FOREIGN PATENT DOCUMENTS

| 52-36230 | 3/1977 | Japan . |
| 52-61636 | 5/1977 | Japan . |
| 53-34017 | 3/1978 | Japan . |
| 56-146030 | 11/1981 | Japan . |
| 59-51145 | 3/1984 | Japan . |
| 59-90736 | 5/1984 | Japan . |

Primary Examiner—Rodney H. Bonck
Assistant Examiner—Saul Rodriguez
Attorney, Agent, or Firm—Kenyon & Kenyon

[57] ABSTRACT

A control device for a variable displacement engine, coupled with an automatic transmission, for an automobile, wherein the control device controls cylinders depending on the driving condition. The control device changes working cylinders without changing the number of working cylinders during the shift operation of the automatic transmission by detecting that the automatic transmission is going to shift. When the control device changes working cylinders without changing the number of working cylinders, the control device controls cylinders so that cylinders which are non-working before the changing work after the changing, and controls cylinders so that a non-working cylinder is not followed by another non-working cylinder in the firing order of the case of all cylinders are working. When intake air is introduced into non-working cylinders and catalytic converters are required, the catalytic converters are so arranged that gases exhausted from non-working cylinders are introduced into catalytic converters which are different from catalytic converters into which gases exhausted from working cylinders are introduced through all conditions with some of cylinders working, and the quantity of intake air introduced into each working cylinder when some of cylinders work is greater than the quantity of intake air introduced into each cylinder when all cylinders work. The control device also controls the throttle valve such that the smaller the number of working cylinders, the greater the throttle valve opening relative to the depression of the accelerator pedal.

7 Claims, 9 Drawing Sheets

| 4 CYLINDERS ARE WORKING | 5 CYLINDERS ARE WORKING | 6 CYLINDERS ARE WORKING | 7 CYLINDERS ARE WORKING |
|---|---|---|---|
| PATTERN 1<br>2ND 4TH 6TH 8TH<br>CYL CYL CYL CYL<br><br>1ST 3RD 5TH 7TH<br>CYL CYL CYL CYL<br>1ST, 4TH, 6TH, 7TH CYLINDERS ARE WORKING | PATTERN 1<br><br>2ND, 4TH, 5TH, 6TH 8TH CYLINDERS ARE WORKING | PATTERN 1<br><br>1ST, 4TH, 5TH 6TH, 7TH, 8TH CYLINDERS ARE WORKING | PATTERN 1<br><br>1ST, 3RD, 4TH, 5TH 6TH, 7TH, 8TH CYLINDERS ARE WORKING |
| PATTERN 2<br><br>2ND, 3RD, 5TH, 8TH CYLINDERS ARE WORKING | PATTERN 2<br><br>1ST, 3RD, 5TH, 7TH 8TH CYLINDERS ARE WORKING | PATTERN 2<br><br>1ST, 2ND, 3RD 4TH, 6TH, 7TH CYLINDERS ARE WORKING | PATTERN 2<br><br>1ST, 2ND, 4TH, 5TH 6TH, 7TH, 8TH CYLINDERS ARE WORKING |
| | | | PATTERN 3<br><br>1ST, 2ND, 3RD, 4TH 6TH, 7TH, 8TH CYLINDERS ARE WORKING |
| | | | PATTERN 4<br><br>1ST, 2ND, 3RD, 4TH 5TH, 6TH, 7TH CYLINDERS ARE WORKING |

CONTROL DEVICE FOR VARIABLE DISPLACEMENT ENGINE

BACKGROUND OF THE INVENTION

1. Field of the Invention

The present invention relates to a control device for a variable displacement engine, especially for automobile, which varies the number of working cylinders depending on the driving condition.

2. Description of the Related Art

An engine which stops some of its cylinders working in a partial load driving condition to save fuel, is known as a variable displacement engine.

In the variable displacement engine, some of cylinders stop working, and only the remaining cylinders continue to work, in a partial load driving condition.

On the other hand, in the conventional engine, all the cylinders work all the time, even in a partial load driving condition.

Under the same load condition, to get the same power, the same quantity of air is required for both the variable displacement engine and the conventional engine. Therefore, the intake passages of the conventional engine must be throttled to a smaller size than the intake passages of the variable displacement engine.

Therefore, the intake air pressure, upstream of the intake valve, in the conventional engine is lower than that in the variable displacement engine, and the pumping loss in the conventional engine is greater than that in the variable displacement engine. As a result, the variable displacement engine can save the fuel compared to the conventional engine.

It is known in the related art to change the working cylinders without changing the number of the working cylinders, as disclosed in Japanese Unexamined Patent Publication No. 52-36230, for instance, at intervals of a predetermined number of cycles, or at a predetermined time, or by detecting that the temperature of a catalytic converter is lower than a predetermined value, to prevent a reduction of the life of an engine, due to the repeated cooling-heating cycle, and a reduction in the purifying ability of catalytic converter due to a fall in the temperature of the catalytic converter.

By the way, in the variable displacement engine, such as described above, a shock can occur even if the working cylinders are changed without changing the number of the working cylinders. Especially, in the case of variable displacement engine connected to an automatic transmission, a series of shocks may occur in succession. Because, if the driver accelerates or decelerates a vehicle after running at constant speed with a partial load, a shock occurs when the automatic transmission shift, and then, a shock occurs when the working cylinders are changed.

SUMMARY OF THE INVENTION

In view of the problems in the related art, the object of the present invention is to provide a control device for a variable displacement engine which prevents a driver feeling a shock due to a change of working cylinders.

According to the present invention there is provided a control device for variable displacement engine, coupled with an automatic transmission, for an automobile, to control cylinders depending on driving conditions, the control device comprising a gear shift detecting means for detecting whether or not the automatic transmission is going to shift, the control device changing working cylinders without changing the number of working cylinders, during the shift operation when the gear shift detecting means detects that the automatic transmission is going to shift.

The present invention will be more fully understood from the description of preferred embodiments of the invention set forth below, together with the accompanying drawings.

BRIEF DESCRIPTION OF THE DRAWINGS

In the drawings.

1. driving at eight cylinders working with accelerator pedal deeply depressed (point F);
2. driving at eight cylinders working with accelerator pedal lightly depressed (point B);
3. driving at four cylinders working with accelerator pedal lightly depressed (point C);
4. driving at four cylinders working with accelerator pedal depressed midway (point D); and
5. driving at eight cylinders working with accelerator pedal depressed midway (point E).

Figure 1:
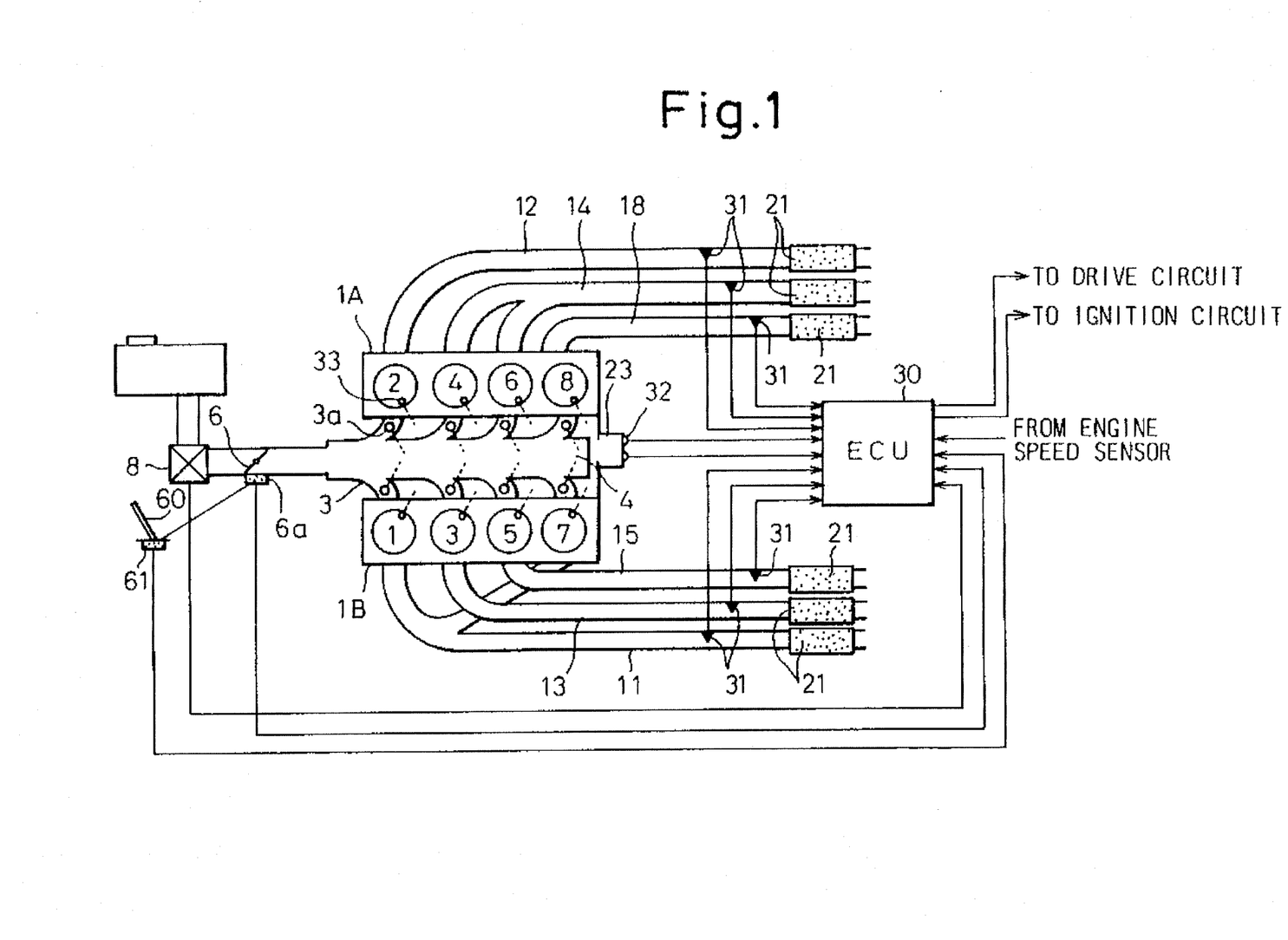
FIG. 1 is a schematic view of an embodiment of a variable displacement engine of V-8 type equipped with the device of the present invention.

In FIG. 1, engine 1 has cylinder banks 1A and 1B. In the bank 1A, the 2nd, 4th, 6th and 8th cylinders are disposed and in the bank 1B the 1st, 3rd, 5th and 7th cylinders are disposed, respectively, from the front to rear.

The intake port or ports of each cylinder are connected to the intake passage 4 through an intake manifold 3 respectively. A fuel injector 3a is attached to each intake manifold 3. An electronic throttle valve 6 is operated by a signal generated by an electronic control unit (hereinafter called ECU) 30 for each number of the working cylinders based upon signal which is output from an accelerator sensor 61 attached to an accelerator pedal 60 and is proportional to a depression stroke of an accelerator pedal 60. A throttle sensor 6a generates a signal proportional to the opening angle of the throttle valve 6. The air flow meter 8 generates a signal proportional to the flow of intake air.

The exhaust ports of the 2nd, 3rd, 5th and 8th cylinder are respectively connected to separated exhaust passages 12, 13, 15, 18. The exhaust ports of the 1st and 7th cylinder are connected to a common exhaust passage 11 and exhaust ports of the 4th and 6th cylinder are connected to a common exhaust passage 14. This arrangement of exhaust passages is determined in due consideration of the combination of working cylinders when some cylinders are working.

$O_2$ sensors 31 are attached to each exhaust passage 11, 12, 13, 14, 15, 18. Each $O_2$ sensor generates a voltage signal of nearly 0.1 volts ("lean voltage") when the air-fuel ratio of the exhaust gas is lean compared to stoichiometric air-fuel ratio, and generates a voltage signal of nearly 0.9 volts ("rich voltage") when the air-fuel ratio of the exhaust gas is rich compared to the stoichiometric air-fuel ratio.

A three-way catalytic converter 21, which purifies HC, CO and NOx in the exhaust gas, is disposed, downstream of the $O_2$ sensors 31, in each exhaust passage 11, 12, 13, 14, 15, 18.

The output shaft of the engine 1 is coupled to an automatic transmission 23, and a revolution sensor 32, which detects the rotational speed of the output shaft of the automatic transmission 23, is attached to the automatic transmission 23.

The ECU 30 controls the variable displacement engine 1. The ECU 30 is constructed as a digital computer and comprises a central processing unit (CPU, not shown), a read-only-memory (ROM, not shown), a random-access-memory (RAM, not shown), an input port (not shown), output port (not shown) and other components.

The ECU 30 works as a means for changing the number of working cylinders, as a means for changing the cylinders to which fuel is injected and as a means for detecting a gear shift in the automatic transmission 23, in addition to general controls such as the quantity of fuel to be injected or the ignition timing.

Signals from the air flow meter 8, the revolution sensor 32, each of the $O_2$ sensors 31, the throttle sensor 6a, and the accelerator sensor 61 are input to the input ports of the ECU 30. Signals from a coolant temperature sensor (not shown), an engine speed sensor (not shown) are input to input port of the ECU 30. The signals are input to the input port of the ECU 30 directly or through analog-digital converter (not shown) if necessary.

The output port of the ECU 30 is connected to the electronic throttle valve 6 to control the opening angle of the throttle valve 6 and to the fuel injectors 3a and the ignition plugs 33 to control fuel injection and ignition for each cylinder.

As described above, when some of cylinders work, the quantity of intake air introduced into each working cylinders should be increased compared to the quantity of intake air introduced into each working cylinder when all cylinders are working. In the embodiment of the present invention, the quantity of the total intake air should be further increased, because intake air is also introduced into non-working cylinders.

Therefore, in the embodiment of the present invention, the total air intake is increased, by increasing the opening angle of the electronic throttle valve 6, according to a decrease in the number of working cylinders.

Figure 2A:
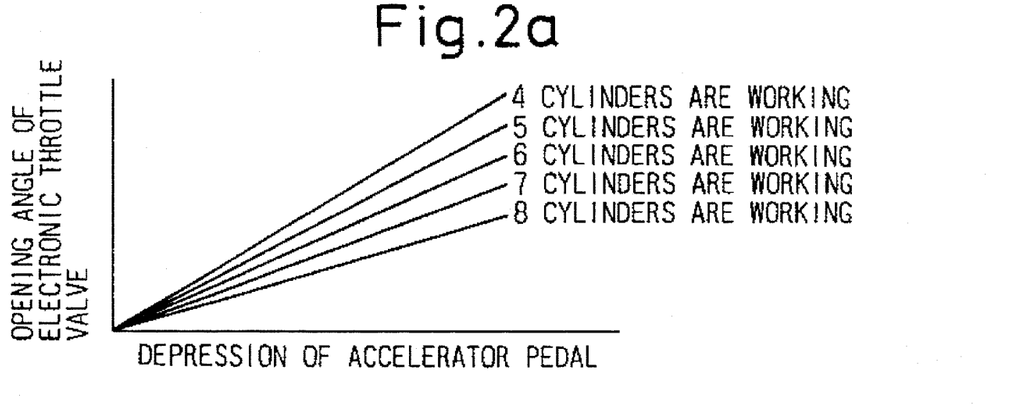
FIG. 2a shows opening angle of the electronic throttle valve 6 relative to the depression of the accelerator pedal corresponding to the numbers of the working cylinders.

FIG. 2a shows the opening angle of the electronic throttle valve 6 relative to a depression of the accelerator pedal 60 corresponding to the number, from four to eight, of the working cylinders. As shown in FIG. 2a, the opening angle of the electronic throttle valve 6 relative to the depression of accelerator pedal 60 in the condition of driving with four cylinder is largest and decreases according to an increase of the number of the working cylinders, and is smallest when driving with eight, that is all, cylinders.

Figure 2B:
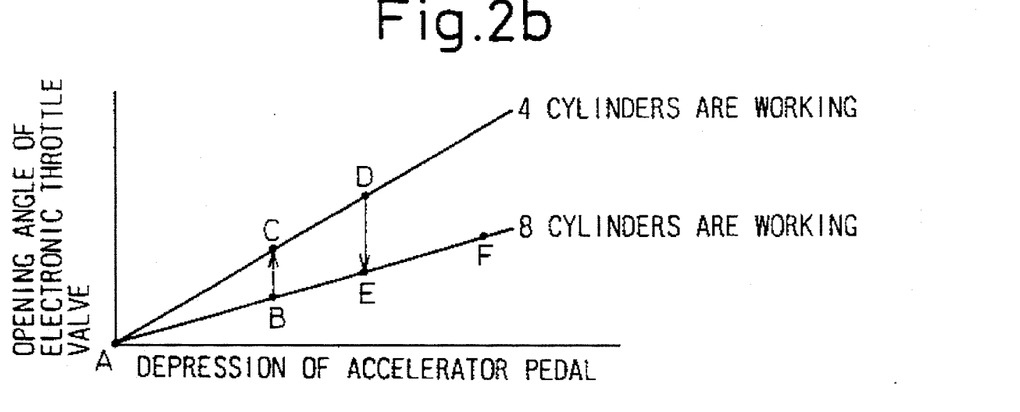
FIG. 2b is a map showing opening angle of throttle valve relative to the depression of the accelerator pedal, when driving condition is changed as follows.

FIG. 2b shows the change of the opening angle of the electronic throttle valve 6 when the number of the working cylinders changes from four and eight, when driving condition is changed as follows:

1. driving with eight cylinders working with the accelerator pedal 60 deeply depressed (point F);
2. driving with eight cylinders working with the accelerator pedal 60 lightly depressed (point B);
3. driving with four cylinders working with the accelerator pedal 60 lightly depressed (point C);
4. driving with four cylinders working with the accelerator pedal 60 depressed midway (point D); and
5. driving with eight cylinders working with the accelerator pedal 60 depressed midway (point E).

Figure 2C:
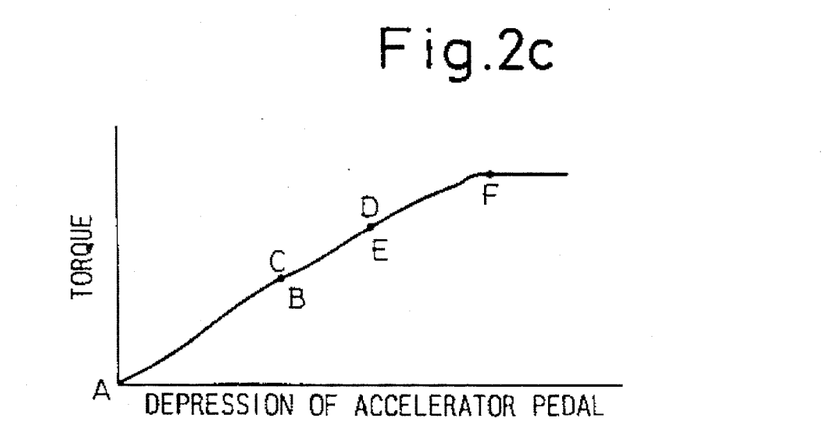
FIG. 2c is a map showing torque output relative to a depression stroke of accelerator pedal.

FIG. 2c shows that torque relative to the depression of the accelerator pedal 60 is kept in the same even if the number of the working cylinders is changed. This is obtained by setting the opening angle of the electronic throttle valve 6 relative to the depression of the accelerator pedal 60, so that the smaller the number of working cylinders, the greater the electronic throttle valve 6 is opened as shown in FIG. 2a.

Figure 3:
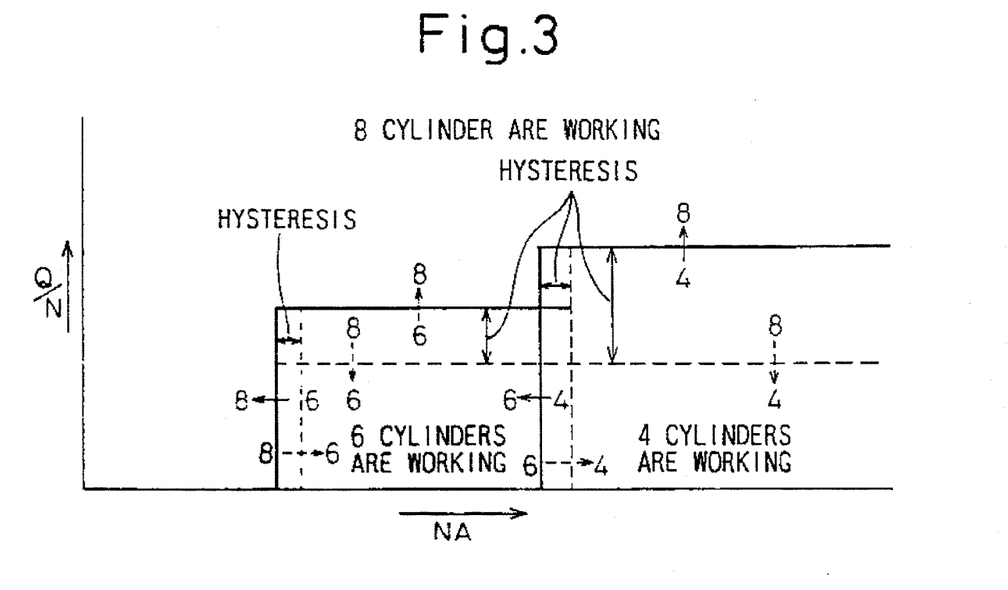
FIG. 3 is a map showing driving areas according to numbers of working cylinders relative to a load defined by the rotating speed of output shaft of an automatic transmission NA (horizontal line) and engine load Q/N (vertical line).

FIG. 3 shows an example of changing the number of working cylinders, corresponding to the engine load and rotating speed of the automatic transmission, by the ECU 30. In FIG. 3, only changes between four, six and eight working cylinders are shown to avoid complicating the figure. However, practically, the number of working cylinders is changed between four, five, six, seven and eight.

The rotating speed NA signal from the output shaft of the automatic transmission generated by sensor 32 and A–D converted by ECU, the intake air flow Q signal generated by air-flow meter 8, the rotating speed N signal from the crankshaft of the engine 1 are used to calculate the quantity of intake air per one revolution of the crankshaft of the engine 1.

The vertical line in FIG. 3 represents a value Q/N, here, Q is the quantity of intake air, and N is the rotating speed of the crankshaft of the engine 1. Therefore Q/N is the quantity of intake air per one revolution of the crankshaft of the engine 1, and Q/N is used as a parameter representing the load on the engine.

The horizontal line in FIG. 3 shows the rotating speed NA of the output shaft of the automatic transmission 23, and NA is used as a parameter representing the vehicle speed. It is also possible to replace the horizontal line in FIG. 3 from rotating speed NA of the output shaft of the automatic transmission 23 to N of rotating speed of the crankshaft of the engine 1.

As shown in FIG. 3, in the embodiment of the present invention, the higher the rotating speed NA of the output shaft of the automatic transmission 23, the smaller the number of working cylinders, in the area of low load, i.e. in the area with low value of Q/N.

As described above, in the variable displacement engine of the embodiment of the present invention, the smaller the number of working cylinders, the greater the output power from each cylinder. Therefore, in a low load condition, the smaller the number of working cylinders, the lower the fuel consumption.

However, the smaller the number of working cylinders, the greater the fluctuation of the output torque, and the lower the vehicle speed (or engine speed), the greater the fluctuation of the output torque.

Therefore, it is not preferable to decrease the number of working cylinders suddenly when vehicle is running with low speed.

Accordingly, in the embodiment of the present invention, the lower the vehicle speed (or engine speed), the greater number of cylinders are working, to prevent the worsening of the drivability of a vehicle.

As described above, in the embodiment of the present invention, the smaller number of cylinders works, the wider the electronic throttle valve is opened and the greater quantity of intake air is introduced into the cylinder. Accordingly, the number of the working cylinders may increase again soon after the number of the working cylinder decreases, because when the number of the working cylinder is decreased the quantity of intake air is increased and Q/N may be increased into the area in which engine should work with a larger number of cylinders.

Therefore, the predetermined value for determining of the change of the number of working cylinders has a hysteresis to avoid a hunting phenomena when the number of working cylinders changes.

In FIG. 3, the solid line shows the predetermined value for determining of the change of the number of working cylinders from smaller to larger, and the dotted line shows the predetermined value for determining of the change of the number of working cylinders from larger to smaller.

Figure 4:
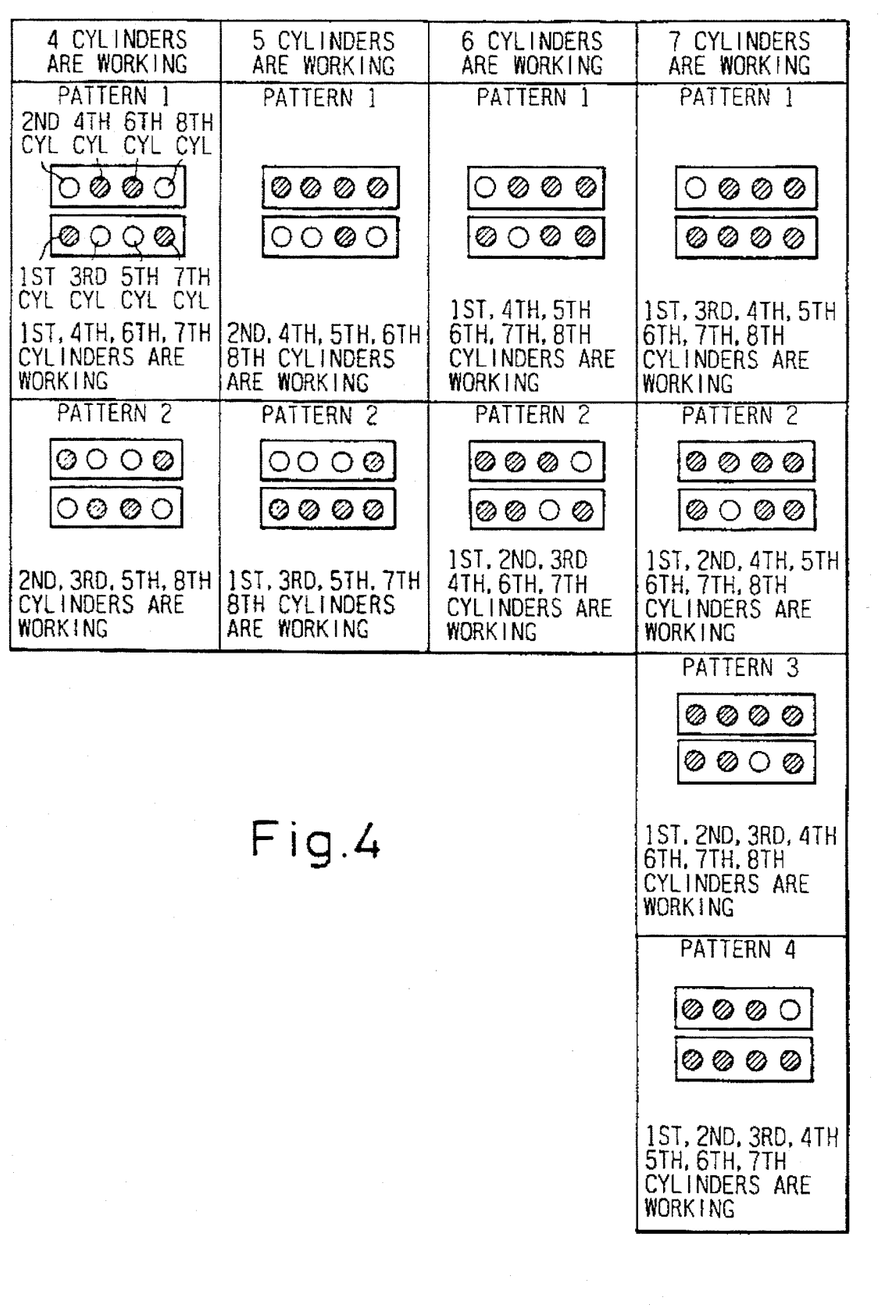
FIG. 4 shows various combination of working cylinders when some of the cylinders work under a partial load condition.

FIG. 4 shows combinations of working cylinders when four of eight, five of eight, six of eight, seven of eight cylinders work.

In FIG. 4, the arrangement of cylinders is same as shown in FIG. 1, and in each combination, bank 1A is shown in the upper side, and bank 1B is shown in the lower side. Each circle in bank 1A in the upper side represents the 2nd, 4th, 6th and 8th cylinder respectively, from left to right, and each circle in bank 1B in the lower side represents the 1st, 3rd, 5th and 7th cylinder respectively, from left to right. A hatched circle represents a working cylinder.

As shown in FIG. 4, in the embodiment of the present invention, engine 1 works with various combination of cylinders when some cylinders work. In FIG. 4, there are shown two patterns of combinations of working cylinders respectively for operation of the engine 1 with four of eight cylinders working, five of eight cylinders, six of eight cylinders working, and four patterns of combinations of working cylinders for the operation of the engine with seven of eight cylinders working.

Of course, it is possible to work with other patterns of combinations of working cylinders.

However, in the embodiment of the present invention, only the patterns of combinations of working cylinders described above are used after due consideration of below described matters.

In conditions with some cylinders working, the engine torque decreases at each timing correspond to the combustion and expansion stroke of non-working cylinders, because the non-working cylinders generate no torque. Therefore, it is desirable to set the order of ignition of working cylinders so as to the torque decreasing are dispersed throughout a cycle.

In the embodiment of the present invention, the engine 1 fires on the following order when all cylinders work: 1st cylinder→8th cylinder→4th cylinder→3rd cylinder→6th cylinder→5th cylinder→7th cylinder→2nd cylinder.

Therefore, the combination of non-working cylinders are set so as to the non-working cylinders are dispersed in the above described ignition order.

Figure 5:
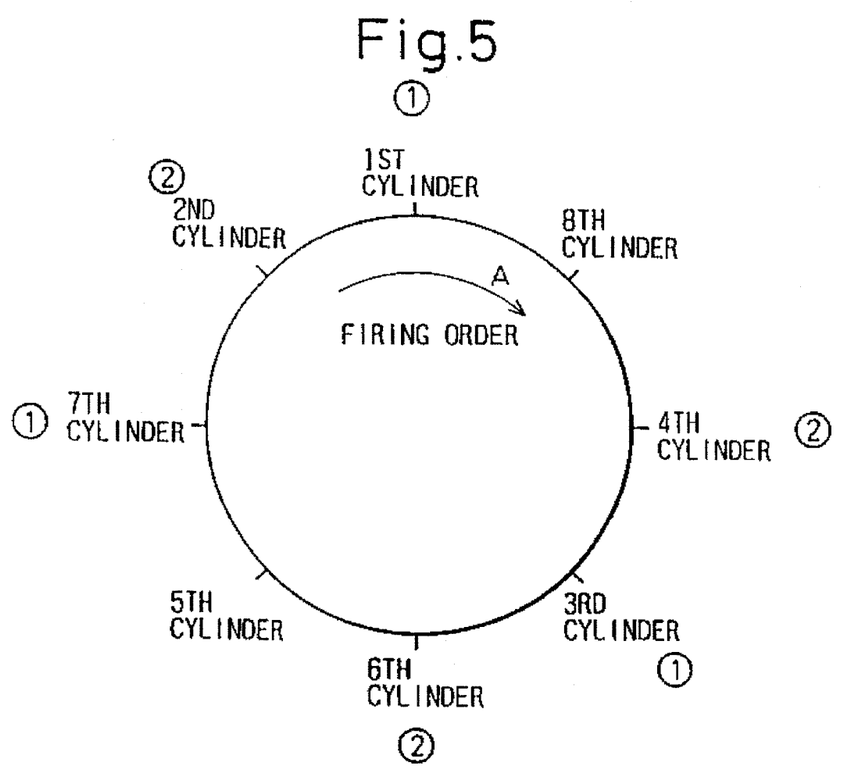
FIG. 5 shows non-working cylinders when five cylinders work, on a map of a firing order for all cylinders (shown by arrow A), in which cylinders marked ① are non-working cylinders according to the 1st combination of working cylinders, and cylinders marked with ② are non-working cylinders according to the 2nd combination of working cylinders.

FIG. 5 shows non-working cylinders on the map of above described firing order, when five of eight cylinders work. As shown in FIG. 5, the 1st, 3rd and 7th cylinders, which are marked with ① and are non-working when five of eight cylinders work according to pattern 1 of the combination, are evenly dispersed. Similarly, the 2nd, 4th and 6th cylinders, which are marked with ②, and are non-working when five of eight cylinders work according to pattern 2 of the combination, are also evenly dispersed.

Though only the case of five of eight cylinders work is shown in FIG. 5, a similar consideration is also made for other cases.

Described below is the reason why plural patterns of combinations of working cylinders are set for each condition driving with some of cylinders working.

In the embodiment of the present invention, intake air is introduced also into non-working cylinders, and this intake air is exhausted into exhaust passages and introduced into the three-way catalytic converter 21 disposed therein at low temperature because no combustion occurs in these cylinders.

Therefore, if the cylinder which stops working is fixed, not only do the engine components deteriorate due to the ill-balanced distribution of the temperature, but also the three-way catalytic converters 21 connected to the non-working cylinders are cooled to below the activating temperature and do not purify the exhaust gas.

Accordingly, to prevent the three-way catalytic converter 21 from being over-cooled, in the embodiment of the present invention, engine 1 works with various combinations of cylinders when only some of cylinders work, and the combination of working cylinders is changed when the automatic transmission 23 shifts.

The combinations of working cylinders, and the combinations of non-working cylinders, shown in FIG. 4 are the minimum required cases to make the non-active time of catalytic converters equal and minimize the number of exhaust passages required.

As shown in FIG. 4, in all the combination of working cylinders, the 1st and 7th cylinders, and the 4th and 6th cylinders operate together respectively, and these sets of two cylinders are respectively connected to common exhaust passages as shown in FIG. 1, and as a result the number of the exhaust systems is reduced.

Figure 6:
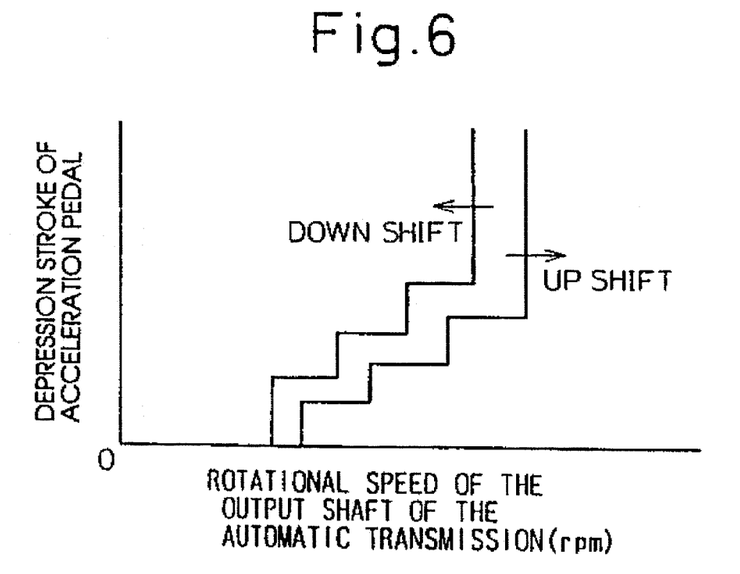
FIG. 6 shows shift diagram of the automatic transmission.

FIG. 6 is a map to determine the shifting of the automatic transmission 23, and it is determined that the automatic transmission 23 is going to shift, when the driving condition defined by the rotational speed of the output shaft of the automatic transmission 23 and the depression stroke of the accelerator pedal is in a region lying between the two stepped lines in the map. If the driving condition, defined as described above, is in a region lying between the two stepped lines in the map with increasing the the rotational speed of the output shaft of the automatic transmission 23, then it is determined that the automatic transmission 23 is going to shift up. If the driving condition defined as described above, is in a region lying between the two stepped lines in the map with decreasing the the rotational speed of the output shaft of the output shaft of the automatic transmission 23, then it is determined that the automatic transmission 23 is going to shift down.

Next, the routine for executing the above described control of the changing of the working cylinder will be described with reference to FIG. 7 to 10.

Figure 7:
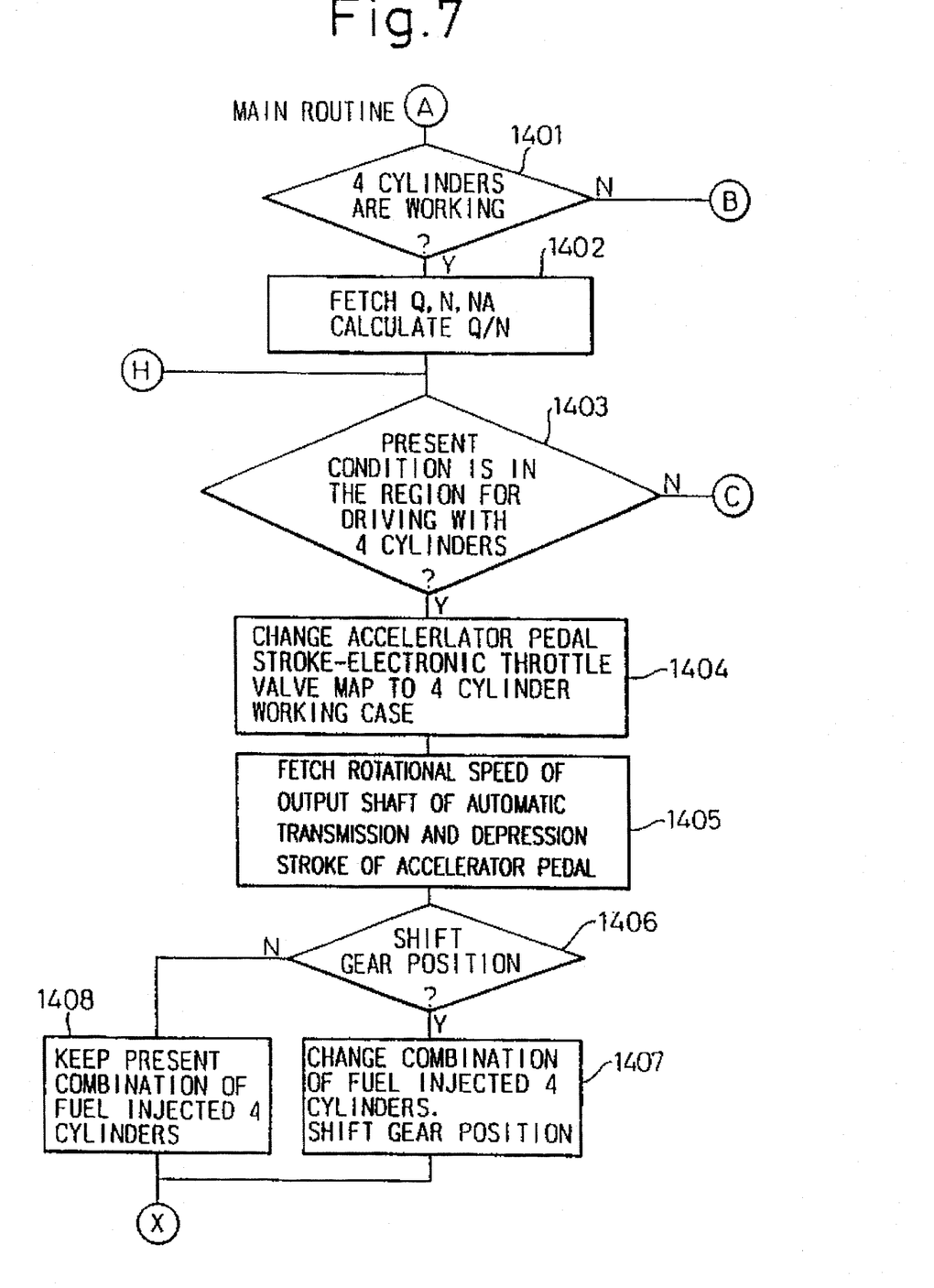
FIG. 7 to 10 are flow charts of the routine carried out by an electronic control unit shown in FIG. 1.

In step 1401, it is determined whether or not four of eight cylinders of the engine 1 are working. If four of the eight cylinders of the engine 1 are working, the routine goes to step 1402. If another number of cylinders among the eight cylinders of the engine are working, the routine goes to step 1501 (in FIG. 8).

In step 1402, a rotating speed signal NA from the output shaft of the automatic transmission 23, generated by sensor 32 and A–D converted by ECU, an intake air flow Q signal, generated by air-flow meter 8, a rotating speed N signal from the crankshaft of the engine 1 are fetched and a quantity of intake air per one revolution of the crankshaft of the engine is calculated by using them, and then the routine goes to step 1403.

In step 1403, it is determined whether or not the present condition is in the area of working with four cylinders, according to the map in FIG. 3. If the present condition is in the area of working with four cylinders, the routine goes to step 1404. If the present condition is not in the area of working with four cylinders, the routine goes to step 1503 (in FIG. 8).

In step 1404, the opening angle of the electronic throttle valve 6 relative to the depression stroke of accelerator pedal 60 is changed to determine by using the predetermined relationship for four cylinders working condition according to the map in FIG. 2a, then the routine goes to step 1405.

In step 1405, a value of rotating speed NA of output shaft of the automatic transmission 23 from revolution sensor 32 and a value of depression stroke of the accelerator pedal 60 from accelerator sensor 61 are fetched and the routine goes to step 1406.

In step 1406, it is determined whether a gear shift will occur or not, according to the map in FIG. 6. If it is determined that a shift will occur, the routine goes to step 1407. Otherwise the routine goes to step 1408.

In step 1407, gear shift is performed, and at the same time the combination of cylinders to which fuel is injected is changed.

In step 1408, the combination of cylinders to which fuel is injected is not changed.

Figure 8:
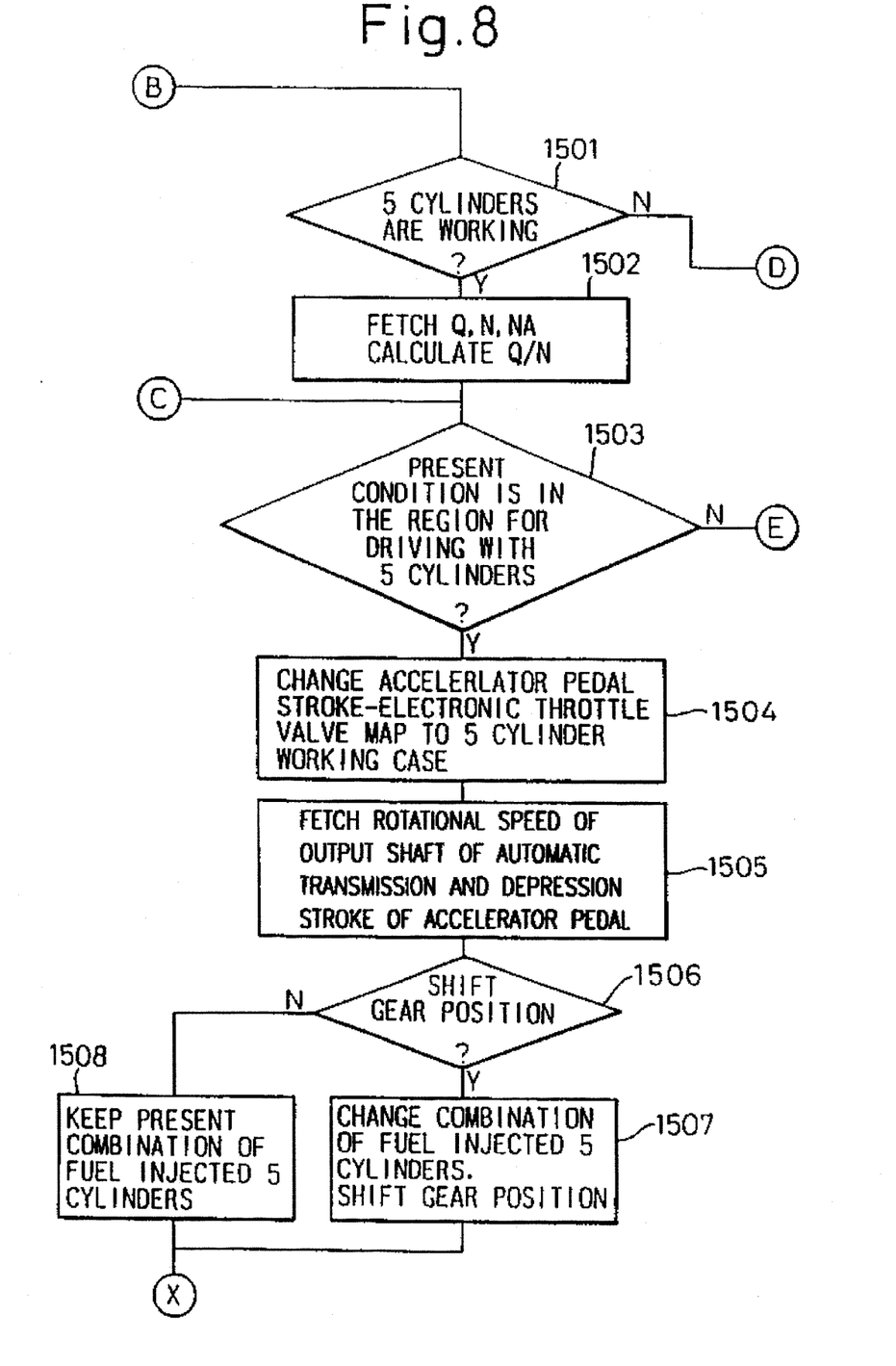
Figure 9:
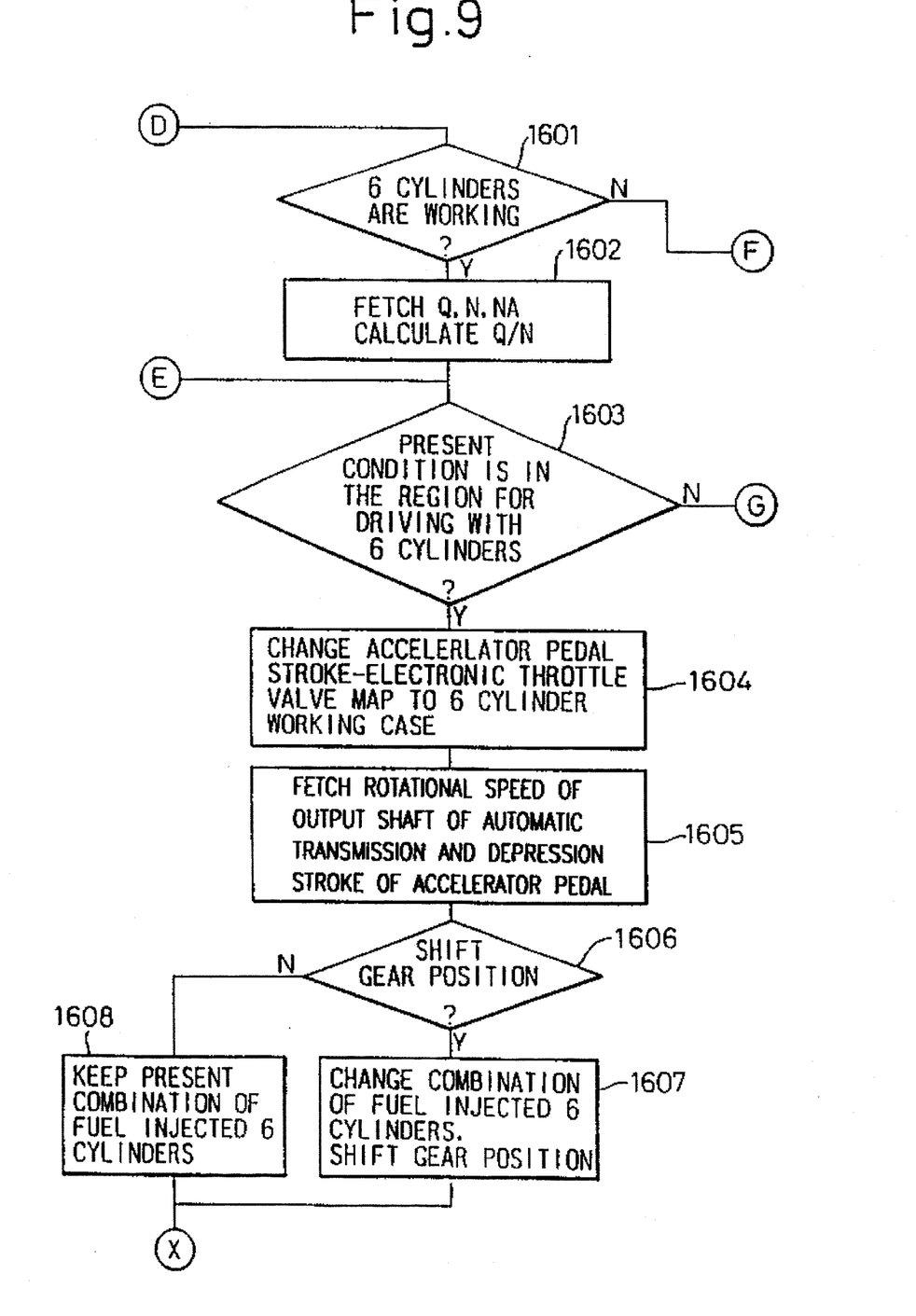
Figure 10:
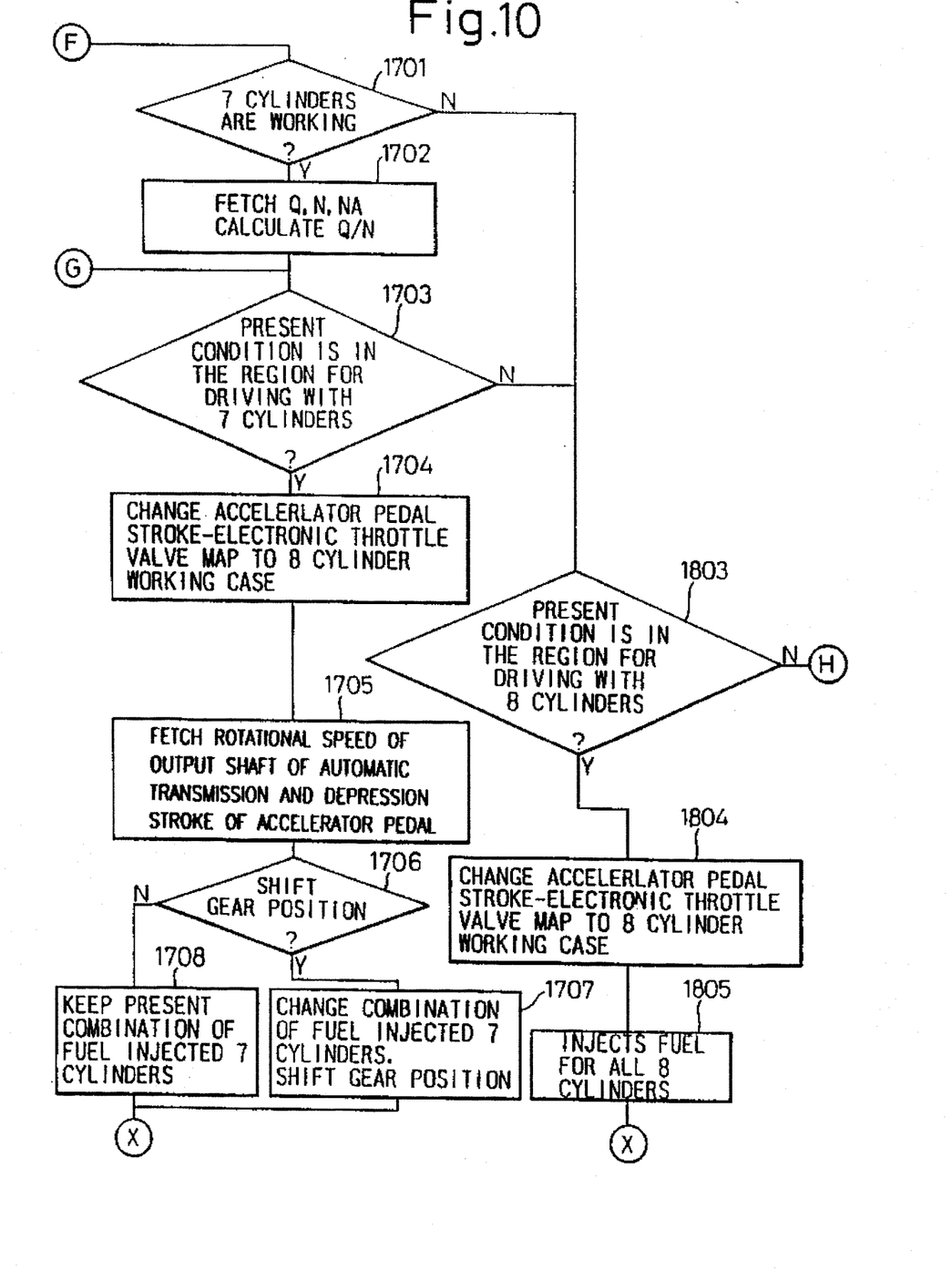

In the same manner, the control for the cases where five cylinders are working is performed according to the routine shown in FIG. 8, and the control for the cases where six cylinders are working is performed according to the routine shown in FIG. 9, and the control for the cases where seven cylinders are working is performed according to the routine shown in FIG. 10.

If the automatic transmission 23 has a lock-up system, preferably the lock-up is released when the number of working cylinders is changed to avoid a shock due to the change of the number of working cylinders.

As explained above, according to the present invention, changing of the working cylinders is performed when the automatic transmission shifts. Therefore, two shocks, one from changing the working cylinders, the other from shifting of the automatic transmission, do not occur in succession, and as a result drivability is improved.

We claim:

1. A control device for a variable displacement engine, coupled with an automatic transmission for an automobile, to control cylinders depending on driving conditions, said control device comprising a gear shift detecting means for detecting whether or not said automatic transmission is going to shift, said control device changing working cylinders without changing the number of working cylinders, during the shift operation when said gear shift detecting means detect that said automatic transmission is going to shift gear position.

2. A control device for a variable displacement engine according to claim 1, wherein said control device controls cylinders so that cylinders which are non-working before said changing of working cylinders without changing the number of working cylinders work after said changing.

3. A control device for a variable displacement engine according to claim 1, wherein said control device controls cylinders so that a non-working cylinder is not followed by another non-working cylinder in the firing order.

4. A control device for a variable displacement engine according to claim 1, wherein intake air is introduced into non-working cylinders.

5. A control device for a variable displacement engine according to claim 4, wherein said variable displacement engine is connected to catalytic converters, and said catalytic converters are so arranged that gases exhausted from non-working cylinders are introduced into catalytic converters which are different from catalytic converters into which gases exhausted from working cylinders are introduced, in any condition where some cylinders work.

6. A control device for a variable displacement engine according to claim 1, wherein the quantity of intake air introduced into each working cylinder when some cylinders work is greater than the quantity of intake air introduced into each cylinder when all cylinders work.

7. A control device for variable displacement engine according to claim 1, wherein the smaller the number of working cylinders, the greater the throttle valve opening relative to the depression of accelerator pedal.

* * * * *